Jan. 11, 1938. K. W. CONNOR 2,105,024
HONING TOOL AND METHOD OF USE
Filed May 16, 1935 4 Sheets-Sheet 4
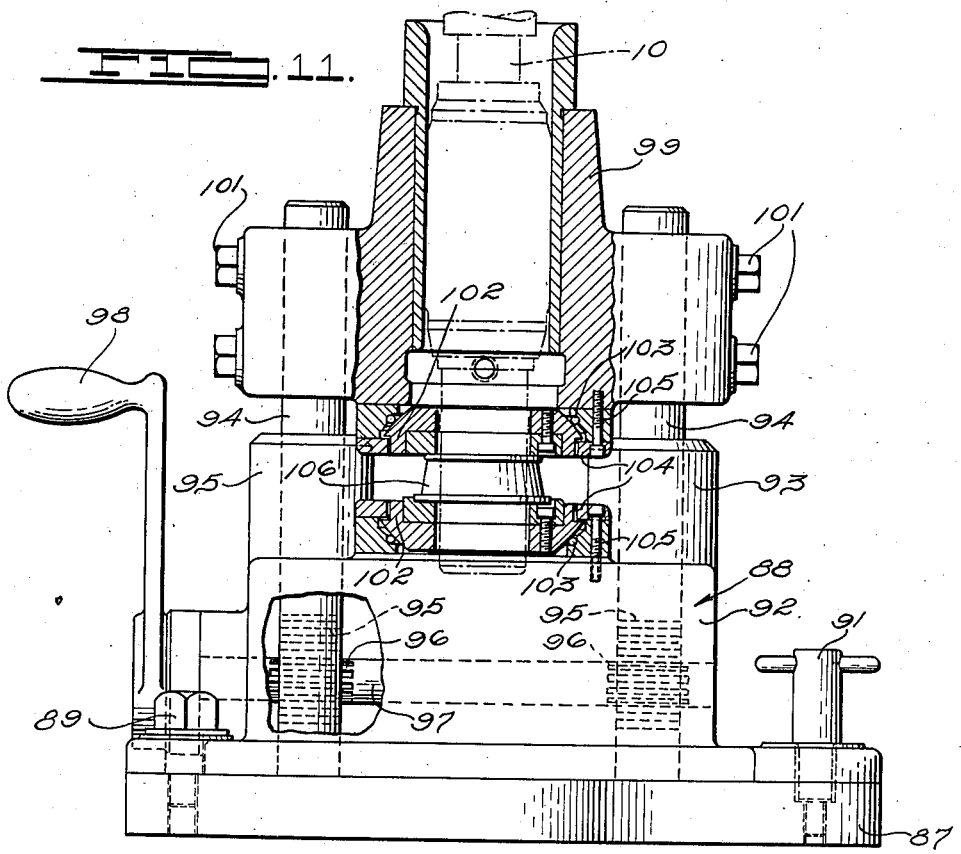
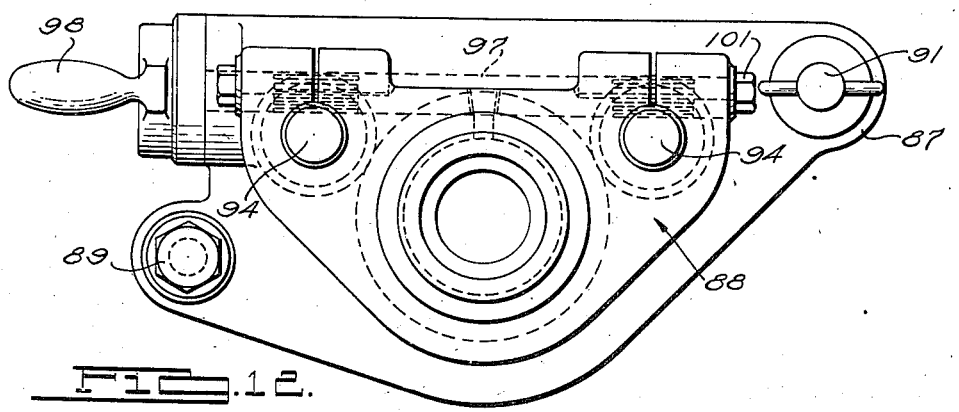
INVENTOR.
Kirke W. Connor.
BY
Harness, Dickey, Pierce & Hann.
ATTORNEYS.

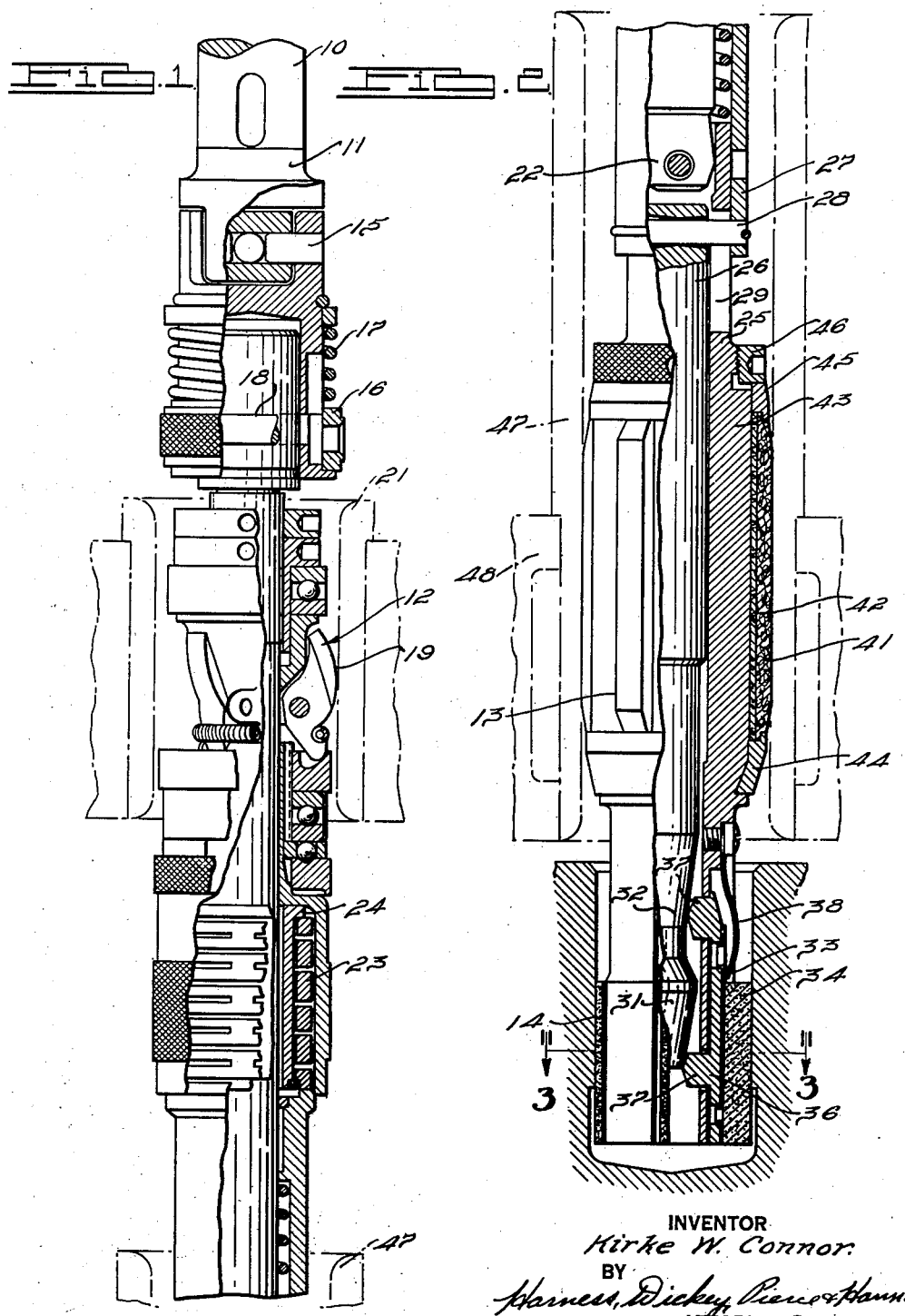

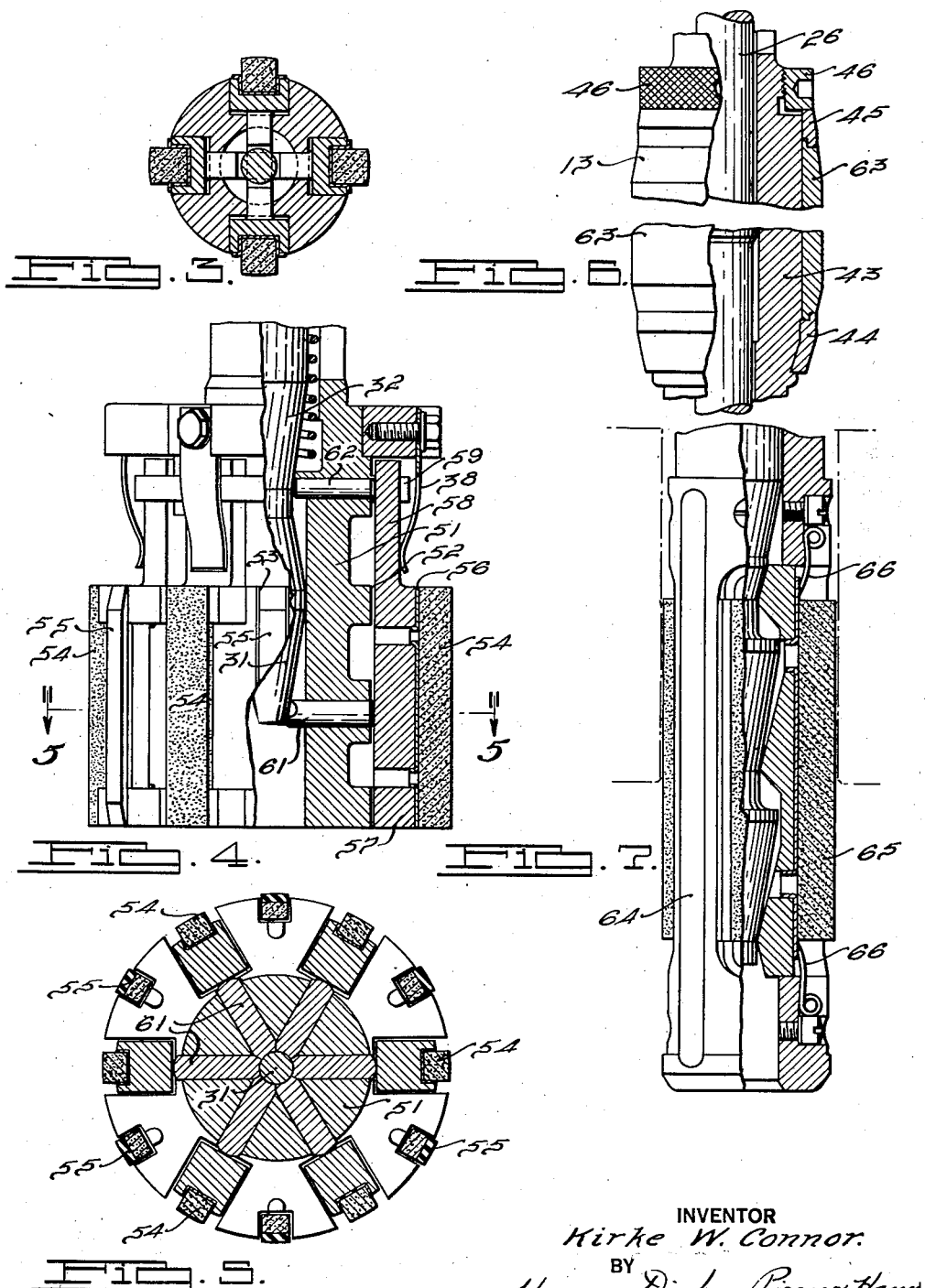

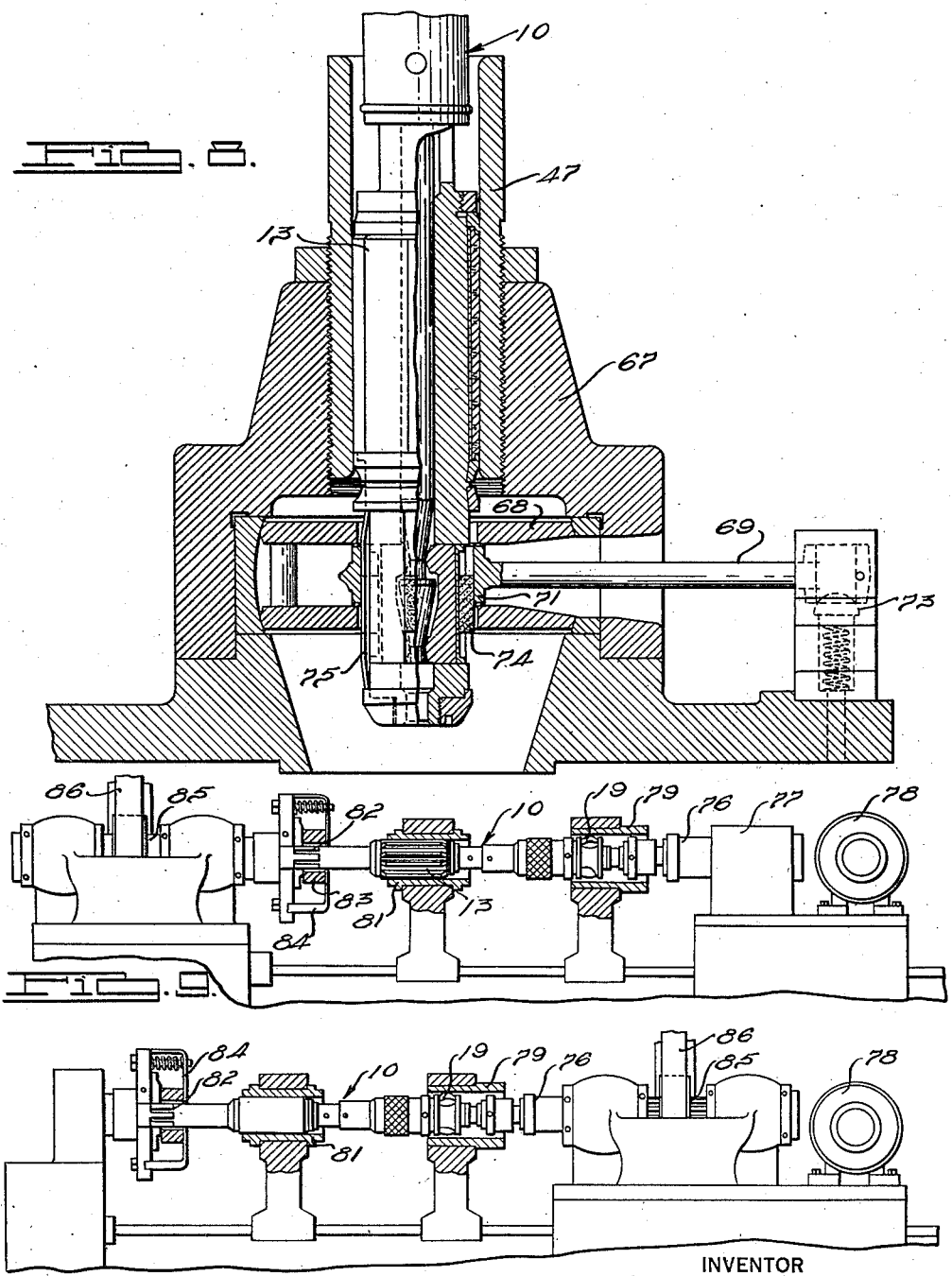

Patented Jan. 11, 1938

2,105,024

UNITED STATES PATENT OFFICE 2,105,024

HONING TOOL AND METHOD OF USE

Kirke W. Connor, Detroit, Mich., assignor to Micromatic Hone Corporation, a corporation of Michigan Application May 16, 1935, Serial No. 21,719

10 Claims. (Cl. 51—184.2)

My invention relates to honing tools and particularly to a honing tool which is positively guided relative to the work during a honing operation.

It has been the practice heretofore to provide honing tools with universal connections in the drive and adjusting shaft to permit the abrading head to adjust itself relative to a cylinder being machined irrespective of the mis-alignment of the driving spindle with the axis of the cylinder. This construction and method proved satisfactory on automobile engine cylinders and the like which are of conventional form. However, on certain other applications this structure and method did not produce the desired accuracy.

In practicing the present invention, the portion of the tool adjacent to the abrading head which is supported for universal movement is provided with a guide which is disposed between the universal joint and the abrading head for accurately positioning the abrading head relative to the cylinder to be machined. In certain instances the abrading head is provided with fixed guiding elements which are spaced circumferentially from the adjustable abrading elements for operating in combination with the guide disposed remotely therefrom. The guiding elements disposed between the abrading elements are illustrated, described and claimed in my co-pending application, Serial No. 622,686, filed July 15, 1932, and assigned to the assignee of the present invention.

The abrading head of the tool may be of any construction and may be so supported as to have the ends of the abrading element free to be employed on blind end holes to reach to the extreme end thereof. A tool having the gludes as above set forth may be advantageously employed to accurately machine cylindrical elements which are of less depth than the diameters, which before the invention of the structure, as set forth in the Patent to K. W. Connor, et al., No. 1,939,205, dated December 12, 1933, and assigned to the assignee of the present invention, was never heretofore attempted. Such structure may be employed in combination with the guides of the present tool to effect a very accurate grinding of such shallow depths of cylindrical surfaces.

The tool thus constructed is further novel in that it may be employed horizontally, to be reciprocated and rotated relative to a work element supported in a chuck or collet or the tool itself may be provided with a reciprocating motion while the chuck or collet is rotated. The abrading head is accurately supported relative to the work by the guide disposed between the abrading head and the universal joint.

Accordingly, the main objects of my invention are: to provide a guiding portion on a honing tool disposed between the abrading head and the universal joint thereof; to provide a guiding portion on the abrading head disposed between the abrading head and the adjusting head of the tool; to provide guiding elements between the abrading element of the abrading head and a guide for the abrading head disposed between the abrading head and the adjusting head of the tool; to provide a support for the abrading element of the abrading head which permits the adjustment of the elements outwardly against the bias of supporting elements which are disposed above the abrading elements for blind end machining; to guide a tool directly above the abrading head for retaining the abrading head accurately guided; to support a work element adjacent to the abrading head of a guided honing tool which is provided with guides between the abrading elements for accurately positioning the work relative thereto; to mount a honing tool horizontally for movement in reciprocation and rotation for operating on a work element; to guide a horizontally disposed honing tool adjacent to the work being operated upon and relatively rotating and reciprocating the tool and work; and in general to provide a honing tool which is positive in operation, simple in construction and economical of manufacture.

Other objects and features of novelty of my invention will be either specifically pointed out or will become apparent when referring, for a better understanding of my invention, to the following description taken in conjunction with the accompanying drawings:

Figure 1 is a view, partly in section and partly in elevation, of the adjusting portion of a honing tool embodying features of my invention;

Fig. 2 is a view partly in section and partly in elevation of the guiding and abrading end of the honing tool, illustrated in Fig. 1;

Fig. 3 is an enlarged sectional view of the structure illustrated in Fig. 2, taken on the line 3—3 thereof;

Fig. 4 is a view of an abrading head of a honing tool, similar to that illustrated in Fig. 2, showing a modified form thereof;

Fig. 5 is a sectional view of the structure illustrated in Fig. 4, taken on the line 5—5 thereof;

Fig. 6 is a broken view, partly in section and partly in elevation, of a guiding portion of a honing tool, similar to that illustrated in Fig. 1, showing a modified form thereof;

Fig. 7 is a view, partly in section and partly in elevation, of abrading end of a tool, similar to that illustrated in Fig. 2, showing a further modified form thereof;

Fig. 8 is a view, partly in section and partly in elevation, of a tool having a guiding portion, similar to that illustrated in Fig. 2, and a work and work support in combination therewith;

Fig. 9 is a view, partly in section and partly in elevation, of a further view of the tool illustrated in Figs. 1 and 2, and Fig. 10 is a view of the structure similar to that illustrated in Fig. 9, showing a modified form thereof.

Fig. 11 is a view, partly in section and partly in elevation, of a tool guiding and a work clamping device, similar to that illustrated in Fig. 8, showing a modified form thereof, and Fig. 12 is a plan view of the structure illustrated in Fig. 11.

A tool 10 is illustrated in Figs. 1 and 2 as being of unique construction throughout, having a driving head 11, an adjusting head 12, a guiding portion 13 and an abrading head 14. The driving head 11 is provided with a universal joint 15 as illustrated and described in my co-pending application, Serial No. 622,686, filed July 15, 1932, and assigned to the assignee of the present invention. The collar 16 is provided on the end of the driving head biased by a spring 17 for forming a locking connection with a pin 18 provided on the end of the adjusting head 12.

The adjusting head may be of a form illustrated and described in the patent to F. L. Jeschke, No. 1,944,660, issued January 23, 1934, or to Kern No. 1,990,331, issued February 5, 1935 and assigned to the assignee of the present invention, or of any other suitable type. A plurality of fingers 19 are forced inwardly when disposed in a sleeve 21 to cause the expansion of the abrading head 14. This permits the insertion and withdrawal of the head while the abrading elements are collapsed so as not to mar the cylinder walls or to damage the abrading elements.

A universal joint 22 is provided intermediate the length of the tool to provide for universal movement between the abrading head, the driving head, and the adjusting head.

A caged spring 23 is provided, having a predetermined limit of expansion, and serves to provide a pressure for effecting the expansion of the abrading elements. Spring 23 is illustrated as being of the tubular slotted type described and claimed in the Patent to F. M. Kern, No. 1,990,331, issued February 5, 1935, and assigned to the assignee of the present invention. The spring is disposed in a cage 24 for limiting the degree to which it may expand, and consequently, to limit the degree to which it may urge the abrading elements outwardly.

Below the universal joint a hollow cylinder 25 is provided to form the body and the driven portion of the abrading head. Within the cylindrical portion 25 a spindle 26 is provided which is supported on the adjusting sleeve 27 for universal movement on the pin 28. The pin is slidable in a slot 29 in the cylindrical housing 25 and by its longitudinal movement, the cones 31 and 32 on its ends, effect the radial expansion of the abrading head.

A plurality of slots 33 are provided on the end of the hollow cylinder 25 in which the abrading stones 34 are disposed secured to shoes 36. The shoes are provided with pins 37 which extend through the cylinder 25 for engagement with the cones 31 and 32. Intermediately between the pins 37, a spring 38 is employed for forcing the abrading stone 34 and the shoe 36 toward the bottom of the slot. The ends of the abrading stone 34 are free of supporting elements and extend to the end of the tool to be employed for blind end holes, as illustrated in Fig. 2.

When the tool is constructed for machining blind end cylinders the slope of the cone 31 is of greater angle than that of the cone 32 to cause the lower end of the abrading stones to move outwardly a greater amount so that the adjustment of the stone relative to the pair of cones will be effected from the bottom to have them shifted to parallelism with the side. In this manner the stone wear is retained uniform and the bottom of the blind hole will be machined just as accurately as the top portion thereof.

To guide the machining end of the tool relative to the hole to be machined thereby irrespective of universal connection in the tool body, the guiding sleeve 13 is provided disposed above the abrading head 14 but below the universal joint 22 of the tool. The guide 13 herein illustrated, comprises a plurality of spaced fibers 41 having a resilient backing 42 of cork, rubber or the like. The guide is disposed about an extended portion 43 of the cylindrical driven portion of the tool, the lower ends thereof being engaged in a ring 44 while the upper end is secured by a ring 45 forced downwardly over the ends by a nut 46. The guide 13 thus formed, projects into a sleeve 47 which is retained in a supporting element 48. The sleeve 47 is aligned with the cylinder to be machined and accurately positions the tool when rotated and reciprocated, to control the position of the abrading head 14.

In Figs. 4 and 5, I have illustrated a blind end tool similar to that illustrated in Fig. 2, but showing a modified form thereof. In this construction the body portion 51 of the tool is provided with two sets of alternate slots 52 and 53 in which abrading elements 54 and guides 55 are alternately disposed. The guides are similar to those above described relative to the guiding portion 13 of the tool illustrated in Fig. 2 which may be disposed in a metal channel element and press fitted within the slots 53. The abrading elements 54 are likewise mounted on a shell 56 which has been described and claimed in the patent to F. J. Jeschke, Re-issue No. 19,149, issued April 24, 1934. The shell is press fitted in a shoe 57 which is supported at its slotted upper end 58 on the slotted flange 59 provided on the tool. A spring 38 presses the holder 57 in the slot 52 at a point between pins 61 and 62 which engage the cones 31 and 32. The shoes and abrading elements are retained against longitudinal movement relative to the tool through the engagement of the slots on the end 58 with the projecting flanges 59, and are moved radially of the tool through the movement of the pins 61 and 62 by the cones 31 and 32. The tool thus constructed is guided by the plurality of guides disposed between the abrading elements and also by the guiding portion 13 of the tool, when employed, for accurately machining blind end cylinders. The lower portion of the abrading elements extend to the end of the tool and thereby are available for reaching into the very bottom of the cylinder.

In Fig. 6, I have illustrated a guiding portion 13 as having the body portion of the guide 63 made solid, in the shape of a sleeve, from any suitable material, which is preferably a bearing metal, solid fiber, cast iron or any other well known bearing material.

In Fig. 7, I have illustrated an abrading head for a tool which is similar to that disclosed in my Patent No. 1,939,205, above mentioned, wherein the guide strips 64 are resiliently mounted in slots in the body of the tool which is constructed to machine open end cylinders having the abrading elements 65 thereof supported by springs 66 at the bottom as well as at the top.

In Fig. 8, I have shown a further extension of my invention wherein the honing tool may be employed to finish cylindrical surfaces having a length materially less than the diameters which has only been successfully accomplished when employing the honing structure as pointed out in a patent hereinabove mentioned. In the present construction, the work supporting housing 67 provided with the sleeve 47 for the guide 13 of the tool, also supports the work holder 68 which is mounted for tilting movement. The work 69 which is herein illustrated as a connecting rod in which the bearing 71 is to be accurately machined, is supported against rotation on a pin 73 and is accurately positioned relative to the abrading stones 74 by guiding elements 75 mounted between the abrading stones. The tool is accurately positioned in the sleeve 47 by the guide 13 and the work is accurately positioned relative to the abrading stone 74 by the guiding elements 75, the work being shiftable laterally as well as tiltable on the holder 68. During the rotational and longitudinal movement of the tool the surface of the bearing 71 is accurately machined. Any cylindrical elements, similar to the bearing 71, may be machined in the same manner through the use of means for holding the cylinder against rotation as illustrated and described in the above mentioned application or by other means well known to one skilled in the art.

In Fig. 9, I have shown a further use for which the tool 10 may be employed. The tool is mounted horizontally, the driving end being supported in a driving head 76 secured in a housing 77 and driven in reciprocation by a motor 78. A sleeve 79 controls the expansion of the abrading head of the tool through the engagement of the fingers 19 on the adjusting portion of the tool. The abrading head 82 is supported and accurately guided by the guide 13 operating in a bushing 81 which accurately aligns the abrading head 82 with the work 83. The work 83 is clamped in the chuck 84 on the end of a spindle 85 which is driven in rotation by a suitable belt, or other means, 86.

In Fig. 10, I have shown a similar construction wherein work is held stationary in a chuck or collet 84 and a tool 10 is driven in reciprocation by a motor 78 and in rotation by a belt, or other driving means, 86. In this manner a honing tool may be employed horizontally for effecting the machining of a work piece the same as on a lathe or similar machine. This is made possible through the employment of the guiding sleeve adjacent to the abrading head of the tool which accurately aligns both ends of the tool with the work.

In Figs. 11 and 12, I have shown a further form of clamping and guiding means for work and tool, respectively, wherein the work is positively clamped after it is located relative to the tool by the tool. A base 87 is clamped to the table of the machine, having a work supporting fixture 88 mounted thereon for movement about a pintle 89 when a locking element 91 is released. With this arrangement, tool 10 may be inserted in fixture 88 while the latter is in a rotative position out of alignment with the machine spindle; after which fixture 88 may be rotated about pintle 89 to a position in which tool 10 is aligned with the spindle of the machine, in which position tool 10 may then be connected thereto. Otherwise additional travel would be required on the machine spindle to permit the tool to be entirely removable in a vertical path from the fixture, while attached to the driving spindle.

The fixture 88 comprises a base 92 having bearings 93 thereon in which rods 94 are vertically movable. The rods are provided with teeth 95 which mate with teeth 96 on a shaft 97 operated in rotation by a handle 98 to which it is secured. The rods 94 have a clamping head 99 adjustably secured thereto by bolts 101. Through the operation of the handle 98, the head 99 is moved to or from the base 92 of the fixture. Adjustable work supporting plates 102 are carried by the base 92 and the head 99, having arcuate portions, supported on balls 103 and retained for limited movement by rings 104 secured in fixed position by bolts 105. Each of the plates 102 is free to adjust itself within a limited degree of movement so that after the tool 10 is inserted within the work, the wipers, abrading elements, or both, may engage and center the work on the fixture. The work, herein illustrated, is a bearing race 106, which after being accurately located relative to the tool, is clamped in position against rotation through the movement of the handle 98, which moves the head 99 toward the base 92.

The device is unique in that the tool itself positions the work which is free to shift its position relative to the tool and to be clamped in this position during the machining operation. The guiding of the tool, its operation and construction, has been clearly set forth hereinabove and will not be described again in detail.

While I have described and illustrated several embodiments of my invention, it will be apparent to those skilled in the art that various changes, omissions, additions and substitutions may be made therein without departing from the spirit and scope of my invention as set forth in the appended claims.

What I claim is:

1. A honing tool having driving and adjusting portions, an abrading head driven by said driving portion, a universal joint between said head and said portions, abrading means in said head expansible by said adjusting portion, and a guide disposed on said tool between the abrading head and said universal joint.

2. A honing tool having driving and adjusting portions, an abrading head driven by said driving portion, abrading means in said head expansible by said adjusting portion, a universal joint between said head and said portions, a guide disposed on said tool between the abrading head and said universal joint, and a sleeve aligned with said cylinder for receiving said guide.

3. A honing tool having a universal joint in the driving and in the adjusting portion, an abrading head driven by said driving portion, abrading elements in said head expansible by said adjusting portion, a guide disposed on said tool between the abrading head and said universal joint, a sleeve aligned with said cylinder for receiving said guide, and additional guiding elements disposed in said head between said abrading elements.

4. A honing tool for machining a cylinder and having an abrading head in which a plurality of abrading elements are disposed, an adjusting head for radially moving said abrading elements, means for actuating said adjusting head, a guide for said tool carried by said tool and disposed between said heads, and a sleeve aligned with said cylinder to be machined for receiving said guide for positioning said abrading head relative to said cylinder.

5. A honing tool comprising a driving portion having on the end thereof abrading elements which are movable radially, adjusting means on said tool comprising a pair of spaced cones rigidly connected together and having different angles of slope, and means interposed between said cones and said abrading elements for moving said abrading elements radially when said cones are moved axially of the tool, said cones being so disposed as to urge the ends of said abrading elements nearest the end of said tool outwardly more than the other ends of said abrading elements.

6. A honing tool having abrading and adjusting heads and, provided with a guide thereon positioned between the abrading and adjusting heads thereof, abrading elements radially movable relative to said abrading head, guides disposed peripherally of said abrading head between said abrading elements, a fixture provided with a sleeve engaging the first said guide, and a holder aligned with said sleeve for receiving an element to be machined, said second guides acting to position said element within said holder.

7. The combination with a honing tool having an abrading head and an adjusting head, guide means disposed between said heads, a fixture having a sleeve thereon for receiving said guide means, a work holder in said fixture having an opening aligned with said sleeve, and guide means on the abrading head for positioning a work piece within said holder.

8. The combination with a honing tool having an abrading head and an adjusting head, guide means disposed between said heads, a fixture having a sleeve thereon for receiving said guide means, a work holder in said fixture having an opening aligned with said sleeve, guide means on the abrading head for positioning a work piece within said holder, and means for retaining said work piece against rotation during the machining operation.

9. The combination with a honing tool having an abrading head of a fixture for clamping the work to be machined, said fixture having opposed tiltable plates, and means for moving said abrading head into said fixture to thereby adjust the positions of said plates to align said work and head, and means acting between said tiltable plates for clamping said plates and said work after being located by said head.

10. In combination, a honing tool for machining a cylinder and having an abrading head provided with a radially expansible abrading element, an adjusting head located remotely from said abrading head for adjusting said abrading element, means for actuating said adjusting head, guide means carried by said tool and positioned thereon between said adjusting and abrading heads, and a sleeve aligned with said cylinder for receiving said guide means, said sleeve and guide means cooperating to position said abrading head relative to said cylinder.

KIRKE W. CONNOR.